US012384155B2

(12) United States Patent
Shirai et al.

(10) Patent No.: US 12,384,155 B2
(45) Date of Patent: Aug. 12, 2025

(54) IMAGE FORMING APPARATUS

(71) Applicant: BROTHER KOGYO KABUSHIKI KAISHA, Nagoya (JP)

(72) Inventors: Haruhisa Shirai, Kasugai (JP); Yuta Arakawa, Nagoya (JP); Shoji Sato, Okazaki (JP); Nobumasa Tanaka, Nagoya (JP); Masahiro Hoga, Ogaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 171 days.

(21) Appl. No.: 18/328,086

(22) Filed: Jun. 2, 2023

(65) Prior Publication Data

US 2023/0405994 A1 Dec. 21, 2023

(30) Foreign Application Priority Data

Jun. 8, 2022 (JP) ................................ 2022-093203

(51) Int. Cl.
*B41J 2/165* (2006.01)

(52) U.S. Cl.
CPC .................................. *B41J 2/1652* (2013.01)

(58) Field of Classification Search
CPC .... B41J 2/1652; B41J 19/207; B41J 2/16508; B41J 2/16526
See application file for complete search history.

(56) References Cited

U.S. PATENT DOCUMENTS

2005/0078145 A1 * 4/2005 Inoue .................. B41J 2/16585 347/31

FOREIGN PATENT DOCUMENTS

JP 2008110523 A * 5/2008 ......... H04N 1/00795
JP 2010-179503 A 8/2010

* cited by examiner

*Primary Examiner* — Sharon Polk
(74) *Attorney, Agent, or Firm* — Scully, Scott, Murphy & Presser, PC

(57) ABSTRACT

The controller moves a movable body along a moving direction. A recording head and a detector are mounted on the movable body. The detector detects a detection target fixed to an ink receiving unit. The ink receiving unit receives an ink jetted from the recording head at a time of a flushing. The controller obtains, based on a signal from an encoder, a position of the movable body in a case that the detection target is detected by the detector during movement of the movable body. The controller determines a start timing of the flushing based on the obtained position of the movable body.

18 Claims, 8 Drawing Sheets

IMAGE FORMING APPARATUS

REFERENCE TO RELATED APPLICATION

This application claims priority from Japanese Patent Application No. 2022-093203 filed on Jun. 8, 2022. The entire content of the priority application is incorporated herein by reference.

BACKGROUND ART

There is a conventionally known ink-jet recording apparatus which is capable of executing flushing of ink from a recording head. The ink flushing is performed so as to prevent any unsatisfactory jetting of the ink at a time of image recording. Further, the ink flushing is performed by conveying the recording head up to a maintenance and recovery mechanism provided on a non-printing area in a main scanning direction. A receiver for ink flushing is provided on the maintenance and recovery mechanism. The flushing receiver receives the ink flushed from the recording head.

DESCRIPTION

In the above-described ink-jet recording apparatus, in a case that an actual position of the flushing receiver is deviated from a position specified by the design and/or an actual size of the flushing receiver is deviated from a size specified by the design, there is such a possibility that the ink might be jetted or flushed to outside of the flushing receiver.

In view of the above-described situation, an object of the present disclosure is to provide a technique capable of performing the flushing of the ink from the recording head at an appropriate position.

According to an aspect of the present disclosure, there is provided an image forming apparatus including: a motor, a movable body, a recording head, an ink receiving unit, a detection target, a detector, an encoder, a position detecting section and a controller.

The movable body is configured to be movable by the motor along a predetermined moving direction. The recording head is mounted on the movable body. The recording head is configured to jet ink onto a sheet while being moved together with the movable body so as to form an image on the sheet. The ink receiving unit is configured to receive the ink jetted from the recoding head at a time of executing a flushing and is fixed so as not to be moved together with a movement of the movable body. The detection target is directly or indirectly fixed to the ink receiving unit. The detector is mounted on the movable body. The detector is configured to detect the detection target. The encoder is configured to output a signal in accordance with a rotation amount of the motor or a moving amount of the movable body. The position detecting section is configured to detect a position of the movable body based on the signal from the encoder.

The controller is configured to execute a moving processing, a position obtaining processing, a determining processing and a flushing processing. The moving processing is a processing of moving the movable body along a moving direction. The position obtaining processing is a processing of obtaining a position, of the movable body, from the position detecting section in a case that the detection target is detected by the detector during a period of time in which the movable body is being moved by the moving processing. The determining processing is a processing of determining a start timing of the flushing based on the position, of the movable body, obtained by the position obtaining processing. The flushing processing is a processing of starting the flushing in accordance with the start timing determined by the determining processing.

In such an image forming apparatus, the actual position of the detection target which is directly or indirectly fixed to the ink receiving unit is obtained by the position obtaining processing. Further, the start timing of the flushing is determined based on the actual position which has been obtained. Accordingly, it is possible to start the flushing at an appropriate timing. Namely, it is possible to jet the ink appropriately to the ink receiving unit at the time of executing the flushing.

In the following, an explanatory embodiment of the present disclosure will be explained with reference to the drawings.

1. EMBODIMENT

(1) Configuration of Image Forming System

Figure 1:
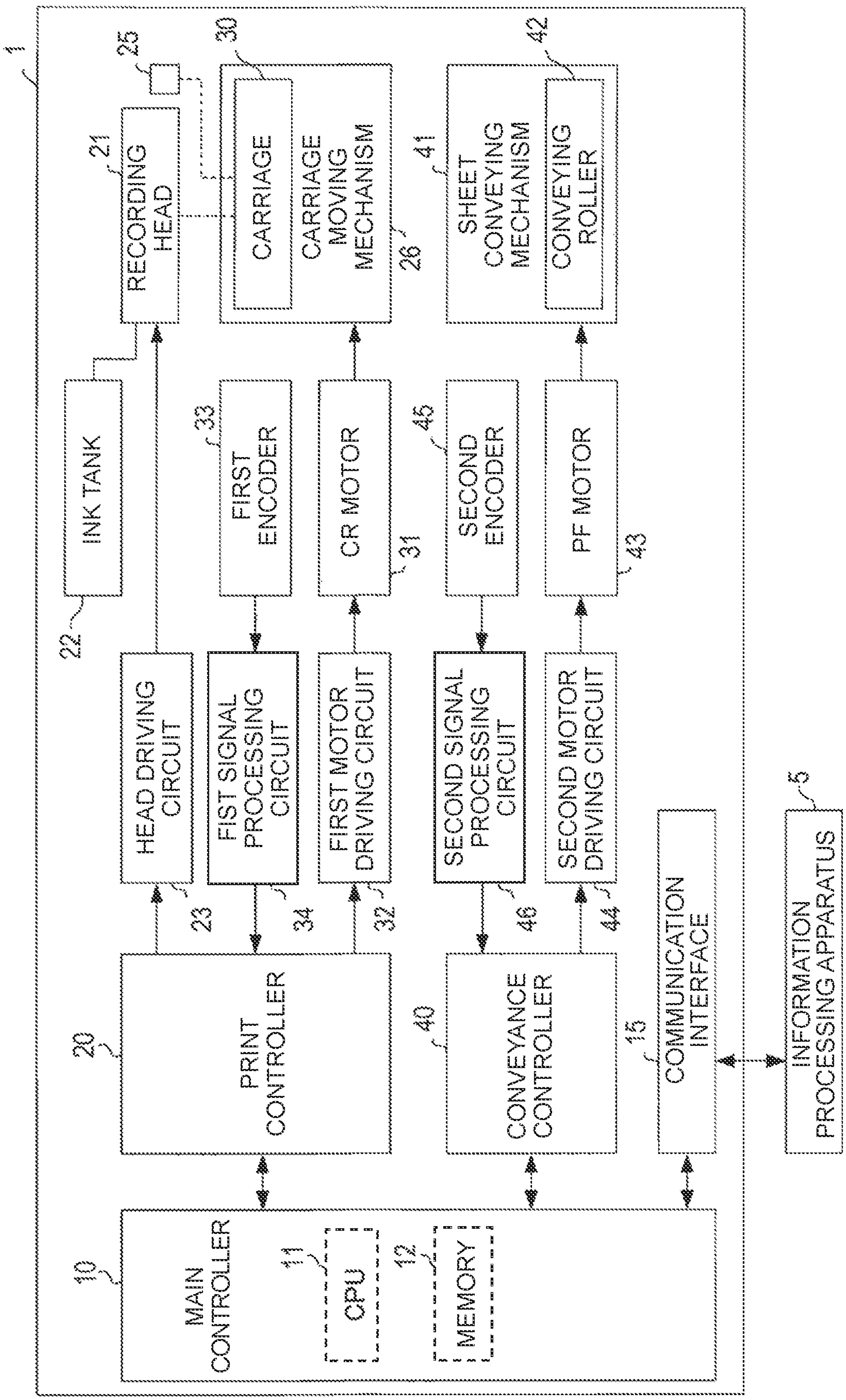
FIG. 1 is a block diagram depicting the configuration of an image forming system of an embodiment.

An image forming system 1 depicted in FIG. 1 is configured as an ink-jet printer.

The image forming system 1 is provided with a main controller 10, a communication interface a print controller 20 and a conveyance controller 40.

The main controller 10 is provided with a CPU 11 and a memory 12. The memory 12 is capable of storing a variety of kinds of programs, data, etc. The memory 12 is provided, for example, with a ROM and a RAM. The ROM stores a variety of kinds of programs. The CPU 11 executes a processing in accordance with these programs. The RAM is used a work space in a case that the CPU 11 executes the processing. The memory 12 may further include a non-volatile storage medium of which storage content is electrically rewriteable (for example, NVRAM). The NVRAM stores data which is required to be stored (maintained) even at a time when the power source of the image forming system 1 is switched OFF. The NVRAM may store a program.

The CPU 11 executes a processing in accordance with the program stored in the memory 12 to thereby control respective parts or components inside the image forming system 1 and to realize respective functions. In the following, a processing executed by the CPU 11 will be explained as a processing executed by the main controller 10.

The communication interface 15 is configured to be capable of performing data communication with an information processing apparatus 5 such as a personal computer, etc. The communication interface 15 may be capable of communicating with the information processing apparatus 5 in accordance, for example, with a communication system such as a USB communication, a Bluetooth communication (Bluetooth is a registered trade mark of Bluetooth SIG), a wired LAN or wireless LAN, etc.

Figure 2:
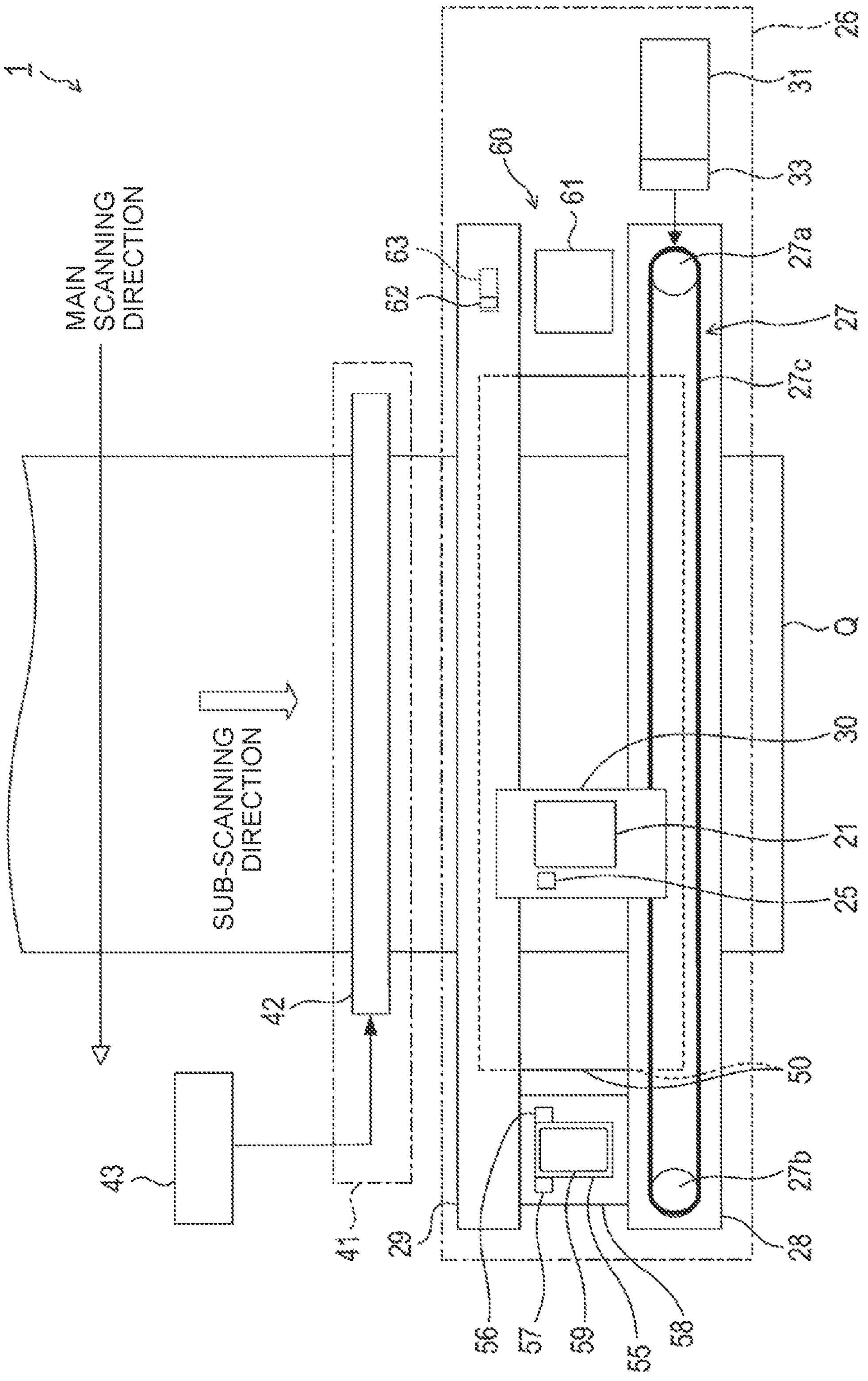
FIG. 2 is a view for explaining the configuration of a carriage moving mechanism and the configuration of a sheet conveying mechanism.

In a case that the main controller 10 obtains image data as an object of printing (printing object) from an external apparatus or device (for example, the image processing apparatus 5) via the communication interface 15, the main controller 15 inputs a variety of kinds of instructions to the print controller 20 and the conveyance controller 40 so that an image based on the image data is printed on a sheet (paper sheet, paper) Q (see FIG. 2).

The image forming system 1 is further provided with: a recording head 21, an ink tank 22, a head driving circuit 23, a medium sensor 25, a carriage moving mechanism 26, a CR motor 31, a first motor driving circuit 32, a first encoder 33 and a first signal processing circuit 34. The carriage moving mechanism 26 is provided with a carriage 30, and causes the carriage to reciprocally move in a main scanning direction. The carriage 30 has the recording head 21 and the medium sensor 25 mounted thereon. In a case that the carriage 30 moves, the recording head 21 and the medium sensor 25 also move together with the carriage 30. The recording head 21 jets an ink toward the sheet Q. The medium sensor 25 detects the sheet Q. In the present embodiment, the medium sensor 25 further detects a first detection target 56 and a second detection target 57 (see FIG. 2, which will be described later on).

The CR motor 31 is a driving source of the carriage 30. The print controller 20 controls the CR motor 31 in accordance with an instruction from the main controller 10 to thereby control conveyance of the carriage 30 by the carriage moving mechanism 26. The print controller 20 further controls a jetting operation of the ink by the recording head 21 in accordance with an instruction from the main controller 10. By performing these controls, the print controller 20 forms the image on the sheet Q.

The ink is filled in the ink tank 22. The ink tank 22 in the present embodiment is not mounted on the carriage 30; rather, the ink tank 22 is arranged at a predetermined position in the image forming system 1. The recording head 21 is connected to the ink tank 22 via a tube (not depicted in the drawings). The ink is supplied from the ink tank 22 to the recording head 21 via the tube. The recording head 21 jets the ink supplied from the ink tank 22.

The head driving circuit 23 drives the recording head 21 in accordance with a control signal from the print controller 20. The carriage moving mechanism 26 transmits a rotational force generated by the CR motor 31 to the carriage 30. The carriage 30 is reciprocally moved along the main scanning direction by the CR motor 31 and the carriage moving mechanism 26. The main scanning direction is orthogonal to a sub-scanning direction. The sub-scanning direction is the conveyance direction of the sheet Q by a sheet conveying mechanism 41 which will be described later on.

The CR motor 31 is, for example, an aspect of a direct current motor. The first motor driving circuit 32 supplies a driving electricity, corresponding to an operation amount inputted from the print controller 20, to the CR motor 31, thereby driving the CR motor 31.

The first motor driving circuit 32 may, for example, apply a voltage or an electric current corresponding to the operation amount to the CR motor 31 to thereby drive the CR motor 31. Further, for example, the first motor driving circuit 32 may drive the CR motor 31 by a PWM (Pulse Width Modulation) control.

The first encoder 33 outputs a signal corresponding to a displacement of the carriage 30 in the main scanning direction (hereinafter referred to as a "first encoder signal"). The first encoder 33 of the present embodiment is an aspect of a rotary encoder. The first signal processing circuit 34 detects a position Px and a velocity Vx in the main scanning direction of the carriage 30 based on the first encoder signal inputted from the first encoder 33, as will be described later on. The position Px and the velocity Vx of the carriage 30 detected by the first signal processing circuit 34 are inputted to the print controller 20 and the main controller 10. Note that the position Px of the carriage 30 may literally be a position of the carriage 30 itself, or a position indirectly indicating the position of the carriage 30 itself. Specifically, the position Px of the carriage 30 may be a position of a specific member mounted on the carriage 30 (for example, a nozzle from which the ink is jetted).

The print controller 20 determines the operation amount with respect to the CR motor 31 based on the position Px and the velocity Vx of the carriage 30 inputted from the first signal processing circuit 34 and controls the CR motor 31. With this, the print controller 20 realizes conveyance control of the carriage 30 in accordance with the instruction from the main controller 10.

The print controller 20 further inputs, to the head driving circuit 23, a control signal for realizing jetting control of the ink in accordance with the instruction from the main controller based on the position Px of the carriage 30 inputted from the first signal processing circuit 34. With this, an ink for forming the image as the print object is jetted from the recording head 21 onto the sheet Q.

The image forming system 1 is further provided with a sheet conveying mechanism 41, a PF motor 43, a second motor driving circuit 44, a second encoder 45 and a second signal processing circuit 46. The conveyance controller 40 controls the PF motor 43 in accordance with the instruction from the main controller 10 to thereby control the conveyance of the sheet Q.

As depicted in FIGS. 1 and 2, the sheet conveying mechanism 41 is provided with a conveying roller 42. The conveying roller 42 extends in the main scanning direction on the upstream side, in the sub-scanning direction, with respect to the recording head 21. The conveying roller 42 rotates by receiving a rotational force from the PF motor 43 to thereby convey the sheet Q which is being conveyed from further upstream side toward a downstream side in the sub-scanning direction. The sheet Q is conveyed in the sub-scanning direction according to the operation of the recording head 21, namely, while an image is being formed thereon by the recording head 21.

The PF motor 43 is, for example, an aspect of a direct current motor. The second motor driving current 44 applies the driving electric power in accordance with an operation amount inputted from the conveyance controller 40 to the PF motor 43 to thereby drive the PF motor 43. The second encoder 45 in the present embodiment is an aspect of a rotary encoder. The second encoder 45 is arranged, for example, in a rotational shaft of the PF motor 43 or a rotation shaft of the conveying roller 42. The second encoder 45 outputs a signal in accordance with the rotation of the rotational shaft in which the second encoder 45 is arranged (hereinafter referred to as a "second encoder signal").

The second signal processing circuit 46 detects a rotational amount and a rotational velocity of the conveying roller 42 based on the second encoder signal inputted from the second encoder 45. The rotational amount and the rotational velocity of the conveying roller 42 correspond to a conveying amount and a conveying velocity of the sheet Q conveyed by the rotation of the conveying roller 42.

The rotational amount and the rotational velocity detected by the second signal processing circuit 46 is inputted to the conveyance controller 40. The conveyance controller 40 determines an operation amount with respect to the PF motor 43 based on the rotational amount and the rotational velocity inputted from the second signal processing circuit 46, and controls the PF motor 43. By doing so, the conveyance controller 40 controls the conveyance of the sheet Q by the conveying roller 42.

The specific configuration of the carriage moving mechanism 26 will be explained with reference to FIG. 2. The carriage moving mechanism 26 is provided with the carriage 30, a belt mechanism 27, a first guide rail 28 and a second guide rail 29. The belt mechanism 27 is provided with a driving puller 27*a*, a driven pulley 27*b* and a belt 27*c*. The driving pulley 27*a* and the driven pulley 27*b* are arranged along the main scanning direction. The belt 27*c* is wound around the driving pulley 27*a* and the driven pulley 27*b*.

The carriage 30 is fixed to the belt 27*c*. In the belt mechanism 27, the driving pulley 27*a* rotates by receiving a driving force from the CR motor 31. Accompanying with and following the rotation of the driving pulley 27*a*, the belt 27*c* and the driven pulley 27*b* are rotated.

The first and second guide rails 28 and 29 extend along the main scanning direction. The first and second guide rails 28 and 29 are arranged to be separated from each other in the sub-scanning direction. The belt mechanism 27 is arranged, for example, in the first guide rail 28. A projected wall (not depicted in the drawings) which extends along the main scanning direction is formed in the first and second guide rails 28 and 29. This wall regulates a moving direction in which the carriage 30 moves to the main scanning direction.

The carriage 30 moves along the main scanning direction on the first and second guide rails 28 and 29 while being linked with the rotation of the belt 27*c*, and while the moving direction of the carriage 30 is regulated by the first and second guide rails 28 and 29. The recording head 21 and the medium sensor 25 move integrally with the carriage 30 along the main scanning direction, in accompanying with the movement of the carriage 30.

As depicted in FIG. 2, the image forming system 1 is further provided with a platen 50. The platen 50 supports the sheet Q conveyed by the sheet conveying mechanism 41. Namely, the sheet Q is conveyed on the platen 50. A length in the main scanning direction of the platen 50 is longer than a length in the main scanning direction of the sheet Q.

The platen 50 is formed and arranged so that a landing position of the ink on the sheet Q, in a case that the ink jetted from the recording head 21 lands on the sheet Q, is present on the platen 50. In the present embodiment, the platen 50 extends, in the sub-scanning direction, from a back side of the first guide rail 28 up to a back side of the second guide rail 29, as depicted in FIG. 2 as an example.

The first encoder 33 is arranged on a detection target-rotary body. The detection target-rotary body may be any rotary body which is configured so that the rotation of the detection target-rotary body and the movement of the carriage 30 are synchronized or follow each other. Namely, the carriage 30 moves together with the rotation of the detection target-rotary body. The detection target-rotary body may be the CR motor 31 (specifically, a rotational shaft of the CR motor 31), the driving pulley 27*a* or the driven pulley 27*b*. In the present embodiment, the detection target-rotary body is, for example, the CR motor 31; as depicted in FIG. 2, the first encoder 33 is provided on the CR motor 31.

The first encoder 33 is, more specifically, provided with a disc-shaped scale (not depicted in the drawings) and an optical sensor (not depicted in the drawings). The scale is fixed to the detection target-rotary body so that the center of the scale is arranged on the rotational shaft of the detection target-rotary body. Namely, the scale rotates integrally with the detection target-rotary body.

The scale is provided with a slit array (not depicted in the drawings). The slit array includes a plurality of slits which are arranged in the entire circumference of the disc-shaped scale and at equal intervals therebetween along the circumferential direction of the scale. The optical sensor is fixed and arranged in the inside of a casing of the image forming system 1 so that the optical sensor faces (is opposite to) the slit array. The optical sensor has a detection position at which the optical sensor detects presence or absence of a slit. Each of the plurality of slits passes the detection position in a case that the scale is rotated. The optical sensor outputs the first encoder signal in accordance with a displacement of the carriage 30 in the main scanning direction. The first encoder signal includes a pulse which is outputted every time a slit (each of the plurality of slits) passes the detection position of the optical sensor.

The optical sensor of the present embodiment outputs a high level signal in a case that a slit (each of the plurality of slits) is passing the detection position, and outputs a low level signal in a case that the slit is not present in the detection position. With this, the first encoder signal which is a pulse signal in accordance with the occurrence of a phenomenon that the slit passes the optical sensor is outputted. The first encoder signal is an analog signal. The first encoder signal is inputted to the first signal processing circuit 34.

Note that the image forming system 1 may be provided with two optical sensors. In this case, the two optical sensors are referred to, respectively, as an A-phase sensor and a B-phase sensor. Further, a detection position of the A-phase sensor is referred to as an A-phase detection position and a detection position of the B-phase sensor is referred to as a B-phase detection position. Furthermore, the first encoder signal from the A-phase sensor is referred to as an A-phase encoder signal and the first encoder signal from the B-phase sensor is referred to as a B-phase encoder signal. The A-phase sensor and the B-phase sensor are arranged to be separated from each other along an arrangement direction of the plurality of slits (namely, along the circumferential direction of the scale). Namely, the A-phase detection position and the B-phase detection position are separated from each other along the circumferential direction of the scale. Accordingly, the phase of the A-phase signal and the phase of the B-phase signal are different from each other by $\pi/2$. The A-phase encoder signal and the B-phase encoder signal are inputted to the first signal processing circuit 34. In the present embodiment, as an example, the explanation will be given provided that the first encoder 33 is provided with the A-phase sensor and the B-phase sensor.

The first signal processing circuit 34 detects a pulse edge of each of the A-phase encoder signal and the B-phase encoder signal. The pulse edge includes a rising edge at which the low level is changed to the high level, and a falling edge at which the high level is changed to the low level.

The first signal processing circuit 34 performs counting of the pulse edge every time the pulse edge of either one of the A-phase encoder signal and the B-phase encoder signal is detected. Specifically, every time the pulse edge of either one of the A-phase encoder signal and the B-phase encoder signal is detected, the first signal processing circuit 34 performs count-up (increments) or performs count-down (decrements) a count value of the pulse edge, in accordance with a signal level of the other of the A-phase encoder signal and the B-phase encoder signal at the time of the detection. For example, it is allowable that the count value is counted up every time the pulse edge is detected in a case that the carriage 30 is moving in the main scanning direction, and that the count value is counted down every time the pulse edge is detected in a case that the carriage 30 is moving in a direction opposite to the main scanning direction (hereinafter referred to as a "home direction"). The count value may be cleared to be an initial value (for example, 0 (zero)) in a case that a predetermined clear condition is established. The predetermined clear condition may include, for example, such a situation that the carriage 30 is moved to a home position, as will be described later on.

The first signal processing circuit 34 detects the position Px of the carriage 30 (hereinafter referred to a "detection position Px") based on the count value, and outputs the detection position Px to the print controller 20. The first signal processing circuit 34 further detects the velocity Vx of the carriage 30 (hereinafter referred to as a "detection velocity Vx"), based on a time interval at which the pulse edge of the A-phase encoder signal is detected or a time interval at which the pulse edge of the B-phase encoder signal is detected. The first signal processing circuit 34 outputs the detection velocity Vx which is detected to the print controller 20.

As depicted in FIG. 2, the image forming system 1 is further provided with a flushing guide 55, a support frame 58, a first detection target 56 and a second detection target 57. In the present embodiment, flushing is performed in some cases. The term "flushing" corresponds to an operation of jetting the ink to a predetermined area, in the recording head 21, which is different from the sheet Q. One of the objects of the flushing is to discharge or exhaust a dried ink adhered to the nozzle from which the ink is jetted in the recording head 21.

In the present embodiment, the flushing guide 55 is arranged, for example, on the downstream side in the main scanning direction with respect to an area, in a conveyance path of the carriage 30, in which the sheet Q is conveyed. More specifically, the flushing guide 55 of the present embodiment is arrange on the downstream side in the main scanning direction, in the conveyance path of the carriage 30, with respect to the platen 50. The support frame 58 is fixed, for example to a part of the casing in the image forming system. Alternatively, the support frame 58 itself may be the part of the casing. The support frame 58 fixes and supports the flushing guide 55.

The flushing guide 55 functions as a receptacle which receives the ink jetted from the recording head 21 at the time of the flushing. More specifically, an ink absorbing member 59 is provided on the flushing guide 55 of the present embodiment. The ink jetted at the time of the flushing lands (namely, adheres), more specifically, on (to) the ink absorbing member 59. The ink absorbing member 59 may have any shape, size and/or material capable of absorbing or attracting the ink jetted at the time of the flushing. The ink absorbing member 59 may have, for example, a sponge-like material. The flushing guide 55 supports the ink absorbing member 59. The flushing guide 55 further suppress occurrence of such a situation that the ink jetted at the time of the flushing and/or the ink absorbed by the ink absorbing member 59 leaks to the surrounding of the flushing guide 55. In order to realize such a function, the flushing guide 55 may have, for example, a plate-like (dish-like) shape having a predetermined depth.

In the image forming system 1 of the present embodiment, even in such a case that the ink jetted at the time of the flushing misses the ink absorbing member 59, it is allowable that the missed ink is in the inside of the flushing guide 55. Accordingly, in the present embodiment, a variety of kinds of correcting calculations is performed (to be described later on) such that the ink jetted at the time of the flushing does not miss the flushing guide 55.

Further, in the present embodiment, the entirety of the flushing guide 55 including the ink absorbing member 59 corresponds to a part of the ink receiving unit in the present disclosure. Note, however, that the ink receiving unit in the present disclosure may be realized by any aspect or form. For example, the ink absorbing member 59 may be detachably attachable with respect to the flushing guide 55. Alternatively, the ink absorbing member 59 may be integrally provided on the flushing guide 55. For example, a part of the flushing guide 55 may be configured to function as the ink absorbing member 59. Alternatively, as will be explained later with reference to FIGS. 7 and 8, the ink absorbing member 59 may be provided singly (namely, without accompanying with the flushing guide 55). In such a case, the ink absorbing member 59 functions as an example of the ink receiving unit of the present disclosure.

In the present embodiment, in a case that the flushing is performed, the carriage 30 is moved in the main scanning direction. Further, in a case that the carriage 30 reaches a predetermined flushing starting position, the flushing is started.

The flushing may be performed in any way, and an ending timing of the flushing may be determined in any way. For example, the flushing may be performed until the carriage 30 moves from the flushing starting position in the main scanning direction by a predetermined distance, or the flushing may be performed, while making the carriage 30 to move from the flushing starting position in the main scanning direction, until a predetermined time elapses. Further, the jetting of the ink in the flushing may be performed continuously or intermittently. In the flushing of the present embodiment, as an example, the ink is jetted from the recording head 21 in a predetermined cycle (hereinafter referred to as a "flushing cycle") while making the carriage 30 to move in the main scanning direction (for example, to move at a constant velocity), by a number of jetting times (hereinafter referred to as a "jetting number of times").

The first and second detection targets 56 and 57 are provided, respectively, on both ends in the main scanning direction of the flushing guide 55. Specifically, the first detection target 56 is provided on an end part on the upstream side in the main scanning direction in the flushing guide 55 and the second detection target 57 is provided on an end part on the downstream side in the main scanning direction in the flushing guide 55. The first and second detection targets 56 and 57 are detected by the medium sensor 25, as described above. The first and second detection targets 56 and 57 may be directly fixed to the flushing guide 55, or may be indirectly fixed to the flushing guide 55.

The first and second detection targets 56 and 57 are provided to detect an actual position (specifically, positions of the both ends) in the main scanning direction of the flushing guide 55. The first and second detection targets 56 and 57 are detected by the main controller 10 based on a detection signal (to be described later on) inputted from the medium sensor 25 to the main controller 10.

The medium sensor 25 is provided to face the platen 50, at a lower surface of the carriage 30 (a surface facing the platen 50). The medium sensor 25 detects an object to be detected (detection-object) such as the sheet Q, the first and second detection targets 56 and 57, etc. The medium sensor 25 is provided with a light-emitting part (not depicted in the drawings) and a light-receiving part (not depicted in the drawings). The light-emitting part includes, for example, a light-emitting element such as a light-emitting diode, etc. The light-receiving part receives a light and outputs a detection signal indicating a light-receiving amount (of the received light).

The main controller 10 outputs a light-emitting instruction to the light-emitting part during a period of time in which the detection object is to be detected. The light-emitting instruction includes a light-emitting amount. In a case that the light-emitting part receives the light-emitting instruction from the main controller 10, the light-emitting part emits the light of an instructed light-emitting amount in a predetermined light-emitting direction. The light-emitting direction is, for example, a direction which is orthogonal or substantially orthogonal to the sheet Q on the platen 50 and is a direction toward the platen 50.

A light irradiated from the light-emitting part is reflected off on an object such as the platen 50, the sheet Q supported by the platen 50, etc., and a reflected light thereof is received by the light-receiving part. In the present embodiment, the irradiated light may be irradiated also onto the first and second detection targets 56 and 57 and may be reflected off by the first and second detection targets 56 and 57.

A light receiving amount by the light-receiving part is different depending on a distance from the light-emitting part to the detection-object and/or a physical property such as a shape, material, color, etc., of the detection-object, etc. The medium sensor 25 outputs, to the main controller 10, the detection signal indicating the light-receiving amount of the light-receiving part. For example, the medium sensor 25 outputs, to the main controller 10, such a detection signal that the voltage becomes higher as the light-receiving amount is greater.

The main controller 10 detects the detection-object based on the detection signal inputted from the medium sensor 25. The main controller 10 may detect the detection object (detection target) based on the detection signal in any method. For example, it is allowable that a range of the light-receiving amount is set with respect to each of detection-objects. Further, it is allowable that the main controller 10 distinguish a detection-object from another detection-object based on whether or not the light-receiving amount indicated by the detection-object is included in the range of the light-receiving amount of which detection-object among the detection-objects. Alternatively, it is also allowable, for example, that a range of a change amount of the light-receiving amount is set with respect to each of the detection-objects. Further, for example, it is allowable that the main controller 10 detects a certain detection-object, among the detection-objects, in a case that there is a change in the light-receiving amount which is included in the range of the change amount of the light-receiving amount of the certain detection-object among the detection-objects.

In a case that the sheet Q is being conveyed on the plate 50, the main controller 10 detects presence and a width (namely, a length in the main scanning direction) of the sheet Q, based on the detection signal from the medium sensor 25. Before executing the flushing, the main controller 10 further detects the first and second detection targets 56 and 57, based on the detection signal from the medium sensor 25.

The main controller 10 detects a first end position and a second end position of the flushing guide 55, based on a first detection position Px1 which is the detection position Px in a case that the first detection target 56 is detected and a second detection position Px2 which is the detection position Px in a case that the second detection target 57 is detected. The first end position corresponds to a position of the end part on the upstream end in the main scanning direction in the flushing guide 55, and the second end position corresponds to a position of the end part on the downstream end in the main scanning direction in the flushing guide 55. In the following, the first end position and the second end position which are detected based on the detection position Px are referred to, respectively, as a "first end detection position Pa" and a "second end detection position Pb".

The first end detection position Pa and the second end detection position Pb may be detected in any way. For example, the first detection position Px1 may be detected (namely handled), as it is, as the first end detection position Pa; and the second detection position Px2 may be detected (namely handled), as it is, as the second end detection position Pb.

In particular, in a case that the first detection target 56 is provided at a position same as or substantially same as the first end of the flushing guide 55, the first detection position Px1 may be detected, as it is, as the first end detection position Pa. Alternatively, also in a case that the first detection target 56 is configured such that the first detection position Px1 and an actual first end detection position Pa are coincident or substantially coincident with each other, the first detection position Px1 may be detected, as it is, as the first end detection position Pa. This is applicable similarly also to the second end detection position Pb; in a case that the second detection target 57 is provided at a position same as or substantially same as the second end of the flushing guide 55, the second detection position Px2 may be detected, as it is, as the second end detection position Pb. Alternatively, also in a case that the second detection target 57 is configured such that the second detection position Px2 and an actual second end detection position Pb are coincident or substantially coincident with each other, the second detection position Px2 may be detected, as it is, as the second end detection position Pb.

Alternatively, it is also allowable that the first end detection position Pa and the second end detection position Pb are detected, considering that the detection object by the medium sensor 25 is not the both end themselves of the flushing guide 55, but the first and second detection targets 56 and 57 provided, respectively, on the both ends of the flushing guide 55. For example, a position obtained by shifting the first detection position Px1 in the main scanning direction by a first predetermined distance is detected as the first end detection position Pa; and a position obtained by shifting the second detection position Px2 in the home direction by a second predetermined distance is detected as the second end detection position Pb. The first predetermined distance may be determined based on a difference between the first detection position Px1 and the actual first end detection position Pa. The second predetermined distance may be determined based on a difference between the second detection position Px2 and the actual second end detection position Pb.

In the following, the explanation will be given provided that the first detection position Px1 and the second detection position Px2 are, respectively, the first end detection position Pa and the second end detection position Pb, as they are, for the purpose of simplifying the explanation.

As depicted in FIG. 2, the image forming system 1 is further provided with a capping mechanism 60. The capping mechanism 60 is arranged on the upstream side, in the main scanning direction in the conveyance path of the carriage 30, with respect to the area in which the sheet Q is conveyed. More specifically, the capping mechanism 60 of the present embodiment is arranged on the upstream side, in the main scanning direction in the conveyance path of the carriage 30, with respect to the platen 50.

The capping mechanism 60 is provided with a cap 61, a lever 62, a hole 63 and a driving mechanism (which is omitted in the drawings). The hole 63 is formed so as to penetrate a part of the second guide rail 29. An end of the lever 62 projects upward from the hole 63. The other end of the lever 29 is mechanically connected to the driving mechanism. The lever 62 is urged in the main scanning direction by an elastic body (not depicted in the drawings).

In a case that the image formation on the sheet Q is ended, the carriage 30 is moved toward the capping mechanism 60 (namely, in the home direction). The carriage 30 which is being moved in the home direction makes contact with the lever 62 and moves the lever 62 in the home direction. With this, the driving mechanism lifts the cap 61 upward. Specifically, by the lever 62 moving in the home direction together with the carriage 30, the cap 61 is gradually lifted upward. Then, in a case that the entirety of the recording head 21 reaches the predetermined home position on the cap 61, the carriage 30 is stopped and the recording head 21 is subjected to capping (capped) by the cap 61, namely, is closed by the cap 61. Specifically, at least the nozzle from which the ink is jetted in the recording head 21 is capped. Note that the capping mechanism 60 may have any configuration such as a configuration capable of capping the recording head 21 by the cap 61 at the home position, etc.

During a period of time in which the printing on the sheet Q is not required, the image forming system 1 basically causes the carriage 30 to stand by at the home position. Then, in a case that a timing at which the carriage 30 is to be moved from the home position in the main scanning direction, such as the image formation on the sheet Q, or other occasion, etc., arrives, the image forming system 1 causes the carriage 30 to move from the home position in the main scanning direction. In a case that the carriage 30 starts to move from the home position in the main scanning direction, the lever 62 also starts to move by an urging force in the main scanning direction, accompanying with the above-described movement of the carriage 30. With this, the cap 61 is moved downward, thereby cancelling the capping of the recording head 21 by the cap 61.

(2) Correction of Flushing Parameter (2-1) Outline

An explanation will be given about correction of a flushing parameter which is one of the most characteristic techniques in the present disclosure. The term "flushing parameter" is a general term for the above-described flushing starting position, the flushing cycle and the jetting number of times. In the present embodiment, in a case that the flushing is performed, a correcting calculation of correcting at least one piece of the flushing parameter is performed. Further, the flushing is performed based on a corrected flushing parameter corrected by the correcting calculation.

(2-2) Object of Correcting Calculation

Before explaining the specific content of the correcting calculation, an object of the correcting calculation will be briefly explained. In a case that a timing at which the flushing is to be executed arrives, the main controller 10 outputs a flushing instruction including the flushing parameter to the print controller 20. In a case that the print controller 20 receives the flushing instruction from the main controller 10, the print controller 20 executes the flushing based on the flushing parameter.

Here, in the present embodiment, the rotary encoder is used as the first encoder 33. Further, the carriage 30 is moved by the belt 27*c*. Accordingly, any variation in the pitch of the belt 27*c* and/or any variation in the intervals between the plurality of slits of the first encoder 33, the detection position Px calculated based on the count value of the first encoder signal in the first signal processing circuit 34 and an actual position of the carriage 30 might be different.

For example, in a case that the entire length of the belt 27*c* is longer than a theoretical value, a moving distance of the carriage 30 per one rotation of the CR motor 31 becomes shorter than a theoretical moving distance of the carriage 30. In such a case, the actual position of the carriage 30 is consequently deviated to the upstream side in the moving direction of the carriage 30 with respect to the detection position Px. Accordingly, for example, it is presumed that, even in a case that the carriage 30 is moved until the detection position Px is coincident with the flushing starting position, the carriage 30 has not actually reached the flushing starting position. In a case that the flushing is started in such a state, there is such a possibility that the ink might be jetted at a location outside of the flushing guide 55 (specifically, on the upstream side with respect to the flushing guide 55).

Further, in a case for example that the number (quantity) of the plurality of slits of the first encoder 33 is smaller than a prescribed value and that the interval between the plurality of slits becomes to be greater than a prescribed interval, a moving distance, of the carriage 30, per one count becomes to be longer than a theoretical moving distance. In such a case, the actual position of the carriage 30 is consequently deviated to the downstream side in the moving direction of the carriage 30 with respect to the detection position Px. Accordingly, for example, it is presumed that, in a case that the carriage 30 is moved until the detection position Px is coincident with the flushing starting position, the carriage 30 has actually advanced past (farther than) the flushing starting position. In a case that the flushing is started in such a state, there is such a possibility that the carriage 30 might pass the flushing guide 55 before the flushing is completed and that the ink might be jetted at a location outside of the flushing guide 55 (specifically, on the downstream side with respect to the flushing guide 55).

Such a deviation between the detection position Px and the actual position of the carriage 30 becomes to be greater as the movement of the carriage 30 advances further (namely, as the count value is increased further). Further, under a condition that the belt 27*c* and the first encoder 33 are theoretically produced (as in the designed values thereof, respectively), although any deviation between the detection position Px and the actual position of the carriage 30 does not occur, there is a possibility that the ink might be jetted at the location outside the flushing guide 55 by any other factor. For example, there is such a possibility that the flushing guide 55 is attached while being deviated from a designed regular (normal) position. Alternatively, there is also such a possibility that the size of the flushing guide 55 itself might be deviated from a designed size. Specifically, there is such a possibility that the size in the main scanning direction of the flushing guide 55 might be shorter than the design size. In such a case, there is such a possibility that the ink might be jetted at a location outside of the flushing guide 55 at the time of the flushing.

A specific aspect in which there is a possibility that the ink might be jetted at the location outside the flushing guide 55 will be explained with reference to FIG. 3. The memory 12 of the main controller 10 stores the above-described flushing parameter, namely, the flushing starting position, the flushing cycle and the jetting number of times. Among those as described above, the flushing starting position stored in the memory 12, namely a design (theoretical) flushing starting position is hereinafter referred to as an "ideal FLS starting position Pst0) (see an upper part of FIG. 3). The memory 12 further stores a design first end position and a design second end position of the flushing guide 55. In the following explanation, the design first end position is referred to as a "first end ideal position Pa0" (see the upper part of FIG. 3) and the design second end position is referred to as a "second end ideal position Pb0" (see the upper part of FIG. 3). Note that a size in the main scanning direction of the flushing guide 55 is Lg0 in design as indicated, as an example, in the upper part of FIG. 3. Further, in design, at the time of the flushing, the ink is jetted in a predetermined design landing range 55*a* with the ideal FLS starting position Pst0 as the starting position. Note that this design landing range 55*a* may be coincident with a range in which the ink absorbing member 59 is present, or may be partially shifted from the range in which the ink absorbing member 59 is present.

In view of this, in the actual image forming system 1, it is presumed that the length of the belt 27*c* or the interval between the plurality of slits of the first encoder 33 is different from the design value. For example, it is presumed that the actual position is advanced with respect to the detection position Px. Further, as depicted in a lower part of FIG. 3 as an example, an actual attachment position of the flushing guide 55 is deviated in the home position with respect to the design attachment position and that the actual size Lg of the flushing guide 55 becomes shorter than the design size Lg0 of the flushing guide 55.

Figure 3:
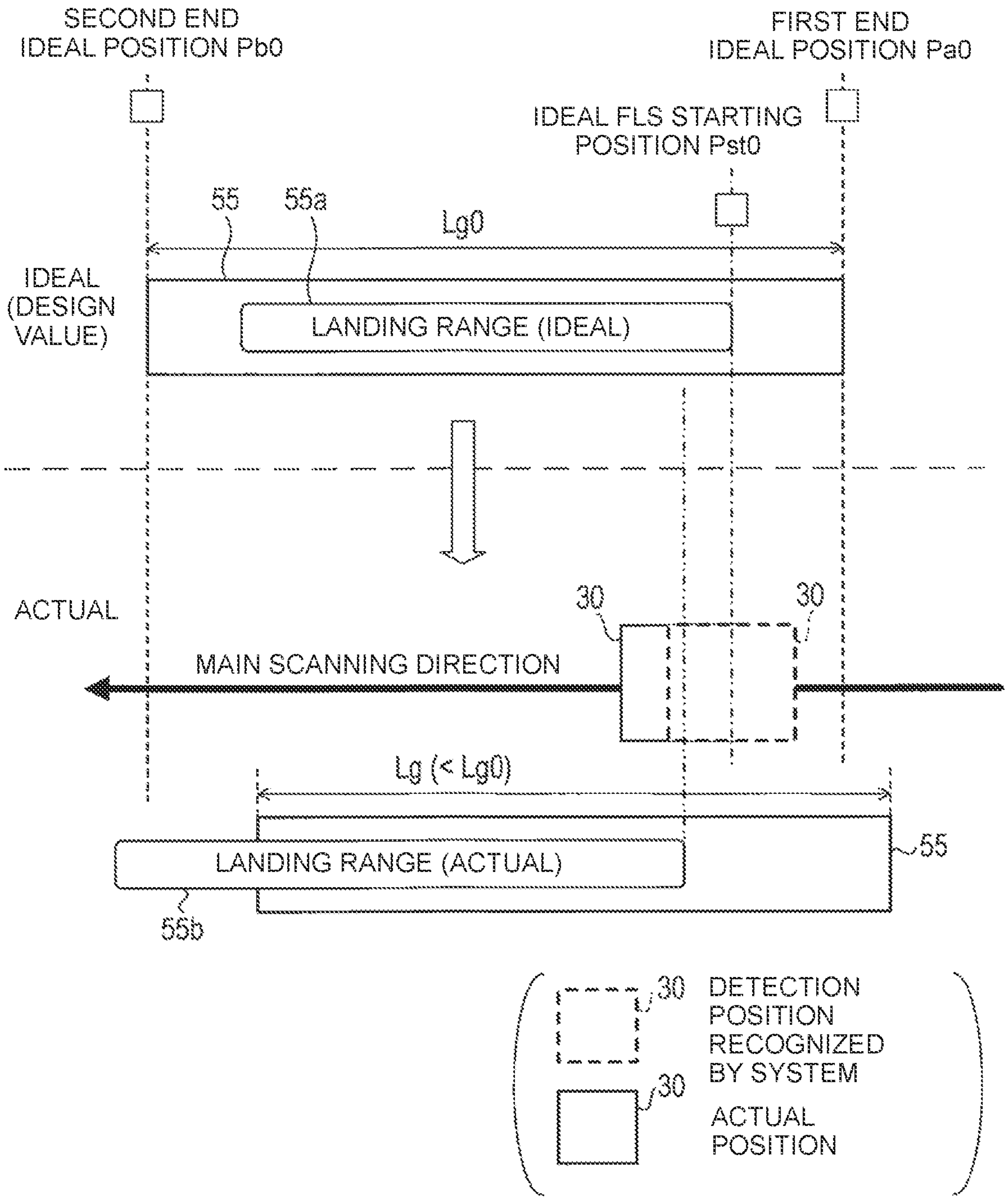
FIG. 3 is a view for explaining a problem which might occur during flushing.

In this case, as depicted in the lower part of FIG. 3 as an example, in a case that the detection position Px, of the carriage 30, recognized by the main controller 10 reaches the ideal FLS starting position Pst0, there is such a possibility that the actual position of the carriage 30 is advanced further than the ideal FLS starting position Pst0. Accordingly, the starting position of the flushing is deviated toward the downstream side in the main scanning direction than the design position. Further, as described above, the actual size Lg of the flushing guide 55 is shorter than the design size Lg0. Due to this, the actual landing range 55*b* at the time of the flushing extends from the flushing guide 55, as depicted in the lower part of FIG. 3 as an example.

Moreover, in the present embodiment, the print controller 20 controls the movement of the carriage 30 by, for example, a velocity feedback control. The velocity feedback control is a control method in which the detection velocity Vx is periodically obtained and an electrified amount to the CR motor 31 is controlled such that the detection velocity Vx coincides with a velocity profile instructed by the main controller 10. The detection velocity Vx used in the velocity feedback control is detected based on the count value of the first encoder signal, as described above.

Accordingly, such a case might occur that the detection velocity Vx and the actual velocity do not coincide with each other due to the variation in the interval between the plurality of slits of the first encoder 33, etc. In the present embodiment, in view of the above situation, the flushing cycle and the jetting number of times in one time of the flushing are instructed by the main controller 10. Thus, in a case for example that the actual velocity is faster than the detection velocity Vx, the carriage 30 passes the flushing guide 55 before the jetting of the ink of the jetting number of times is finished, which in turn might lead to such a possibility that the ink is jetted to the location outside the flushing guide 55 (specifically, on the downstream side with respect to the flushing guide 55).

In view of the above situation, in the present embodiment, the flushing parameter is corrected by the above-described correcting calculation, before the flushing is executed.

(2-3) Specific Content of Correcting Calculation

The specific content of the correcting calculation will be explained, with reference to FIG. 4. Also in FIG. 4, it is presumed, completely same as in FIG. 3, that the actual attachment position and the actual size of the flushing guide 55 are deviated (vary) from the design position and the design size of the flushing guide 55, and that the actual position of the carriage 30 is advanced with respect to the detection position Px.

Prior to the correcting calculation, the main controller 10 first detects the both ends of the flushing guide 55. Specifically, at a time of executing a pre-scan (to be described later on), the main controller 10 moves the carriage 30 from the home position in the main scanning direction. Then, the main controller 10 obtains (detects) the first end detection position Pa in accordance with the detection of the first end of the flushing guide 55 by the medium sensor 25. Further, the main controller 10 obtains the second end detection position Pb in accordance with the detection of the second end of the flushing guide 55 by the medium sensor 25.

Figure 4:
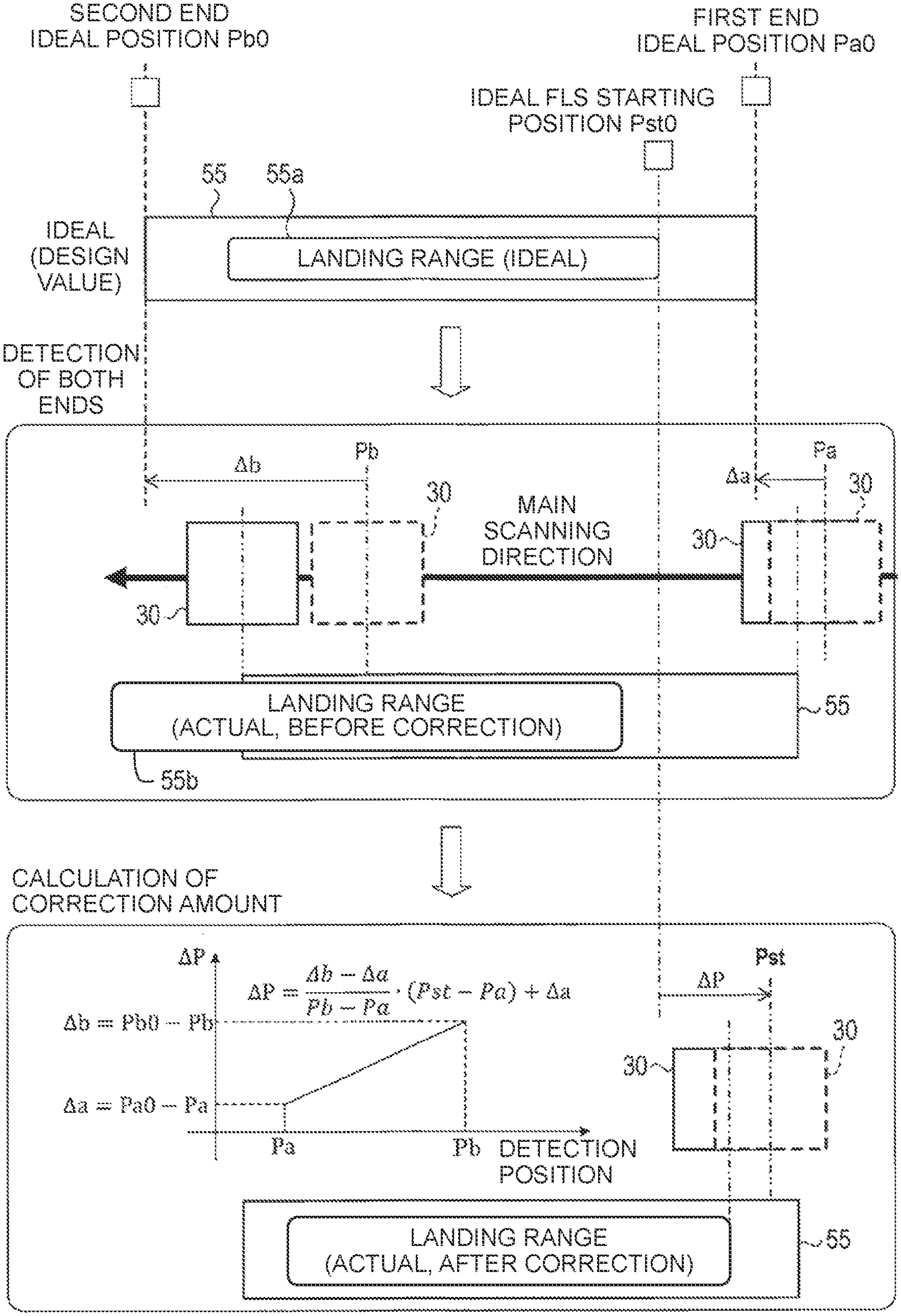
FIG. 4 is a view for explaining the overview of a procedure of correcting calculation (correcting arithmetic) of a flushing starting position.

A middle part of FIG. 4 depicts an example of each of the first end detection position Pa and the second end detection position Pb which are obtained. Namely, in this example, the first end detection position Pa recognized by the main controller 10 in a case that the first end is detected is deviated in the home position with respect to the actual position of the first end. Similarly, the second end detection position Pb recognized by the main controller 10 in a case that the second end is detected is deviated in the home position with respect to the actual position of the second end. Further, an amount of deviation (deviation amount) is greater than a deviation amount between the actual position of the first end and the first end detection position Pa.

Furthermore, in the example of FIG. 4, the first end detection position Pa is deviated from the first end ideal position Pa0 in the home position by Δa, and the second end detection position Pb is deviated from the second end ideal position Pb0 in the home position by Δb.

The main controller 10 uses the first end detection position Pa and the second end detection position Pb which are obtained, the first end ideal position Pa0 and the second end ideal position Pb0, and the ideal FLS starting position Pst0 so as to calculate a correction amount ΔP.

The correction amount ΔP indicates a difference between the ideal FLS starting position and an actual FLS starting position Pst as the detection position Px at which the flushing is actually to be started, as depicted in the lower part of FIG. 4. Namely, by correcting the ideal FLS starting position Pst0 by the correction amount ΔP, the actual FLS starting position Pst is calculated.

In the present embodiment, as indicated by a formula (1) as follows, deduction of correction amount ΔP is made with respect to the ideal FLS starting position Pst0 (namely, the ideal FLS starting position is shifted in the home direction), thereby calculating the actual FLS starting position Pst. Further, the correction amount ΔP is expressed by a formula (2) indicated below, as depicted in the lower part of FIG. 4.

[Formulas]

$$Pst = Pst0 - \Delta P \tag{1}$$

$$\Delta P = \frac{\Delta b - \Delta a}{Pb - Pa} \cdot (Pst - \alpha) + \beta \tag{2}$$

note that Δa=Pa0–Pa, Δb=Pb0–Pb

α=Pa, β=Δa or α=Pb, β=Δb

Pst: Actual FLS starting position

Pst0: Ideal FLS starting position

Pa: First end detection position

Pb: Second end detection position

Pa0: First end ideal position

Pb0: Second end ideal position

As appreciated from Formula (2) indicated above, there are two kinds of combination of α and β. The correction value ΔP may be expressed by using either one of these two combinations. The lower part of FIG. 4 depicts, as an example, a correction value ΔP in a case that α=Pa and β=Δa.

A flushing parameter which is to be ultimately obtained by using the above-described formula (2) is, actually, the actual FLS starting position Pst. In either one of the formulas (1) and (2), a term including the actual FLS starting position Pst is present. Accordingly, the main controller 10 calculates, actually, the actual FLS starting position Pst by using an arithmetic formula of the actual FLS starting position Pst which is obtained, for example, by synthesizing the formulas (1) and (2). In this arithmetic formula, the left side thereof is Pst, and Pst is not present in the right side thereof.

After the main controller 10 calculates the actual FLS starting position Pst in such a manner, the main controller 10 actually executes the flushing. Namely, the main controller 10 causes the carriage 30 to move from the home position in the main scanning direction, and starts the flushing in response to that the detection position Px coincides with the actual FLS starting position Pst. With this, as depicted in the lower part of FIG. 4 as an example, even in a case that the actual attachment position and/or the actual size of the flushing guide 55 are (is) different from the ideal attachment position and/or the ideal size, it is possible to start the flushing from an appropriate position in the flushing guide 55 and to suppress the occurrence of such a situation that the ink is jetted to a location outside of the flushing guide 55.

Here, the flushing parameter which is to be corrected is not limited to or restricted by the flushing starting position. It is allowable to correct the flushing cycle and/or the jetting number of times, in addition to or instead of the flushing starting position. For example, in the examples depicted in FIGS. 3 and 4, an actual velocity is faster than the detection velocity Vx detected based on the count value.

In this case, accordingly, it is allowable for example to shorten the flushing cycle and/or to lower the jetting number of times. More specifically, it is allowable for example to correct the flushing cycle such that as the difference between a and R is greater, the flushing cycle becomes shorter. Alternatively, for example, it is allowable to correct the jetting number of times such that as the difference between a and R is greater, the jetting number of times becomes smaller. The reason for performing the correction in such a manner is that it is expected that as the difference between a and R is greater, the actual velocity is faster than the detection velocity Vx.

Note that contrary to the above-described situation, the possibility that the actual position of the carriage 30 might pass the flushing guide 55 during the execution of the flushing is low in a case that the actual velocity of the carriage 30 is slower than the detection velocity Vx detected based on the count value. Accordingly, in this case, it is allowable that the flushing cycle and the jetting number of times are not corrected. Note, however, that in this case also, it is allowable to correct the flushing cycle and/or the jetting number of times. For example, it is allowable to make the flushing cycle to be long and/or to increase the jetting number of times.

(3) Print Controlling Processing

Figure 5:
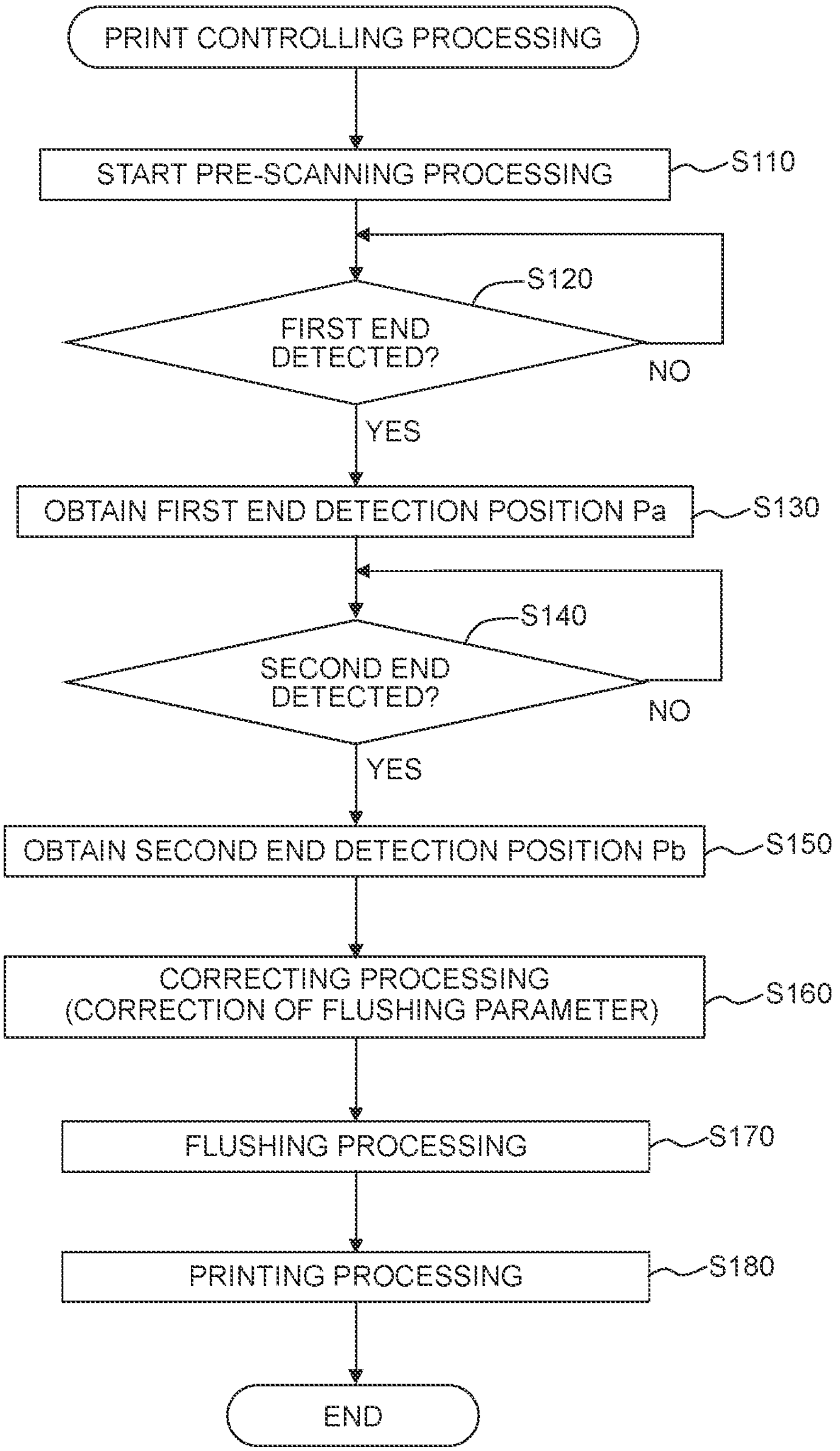
FIG. 5 is a flow chart of a print controlling processing.

A print controlling processing executed by the main controller 10 will be explained, with reference to FIG. 5. In a case that a such a timing at which the image is to be formed on the sheet Q arrives and which is, for example, such a timing that a print instruction is received from the information processing apparatus 5, the main controller 10 reads and then executes a program of the print controlling processing from the memory 12.

In a case that the main controller 10 starts the print controlling processing, the main controller 10 starts a pre-scan processing in step S110. The pre-scan processing is performed for a specified object which is different from the image formation. The specified object may include not less than one object including, for example: determining presence or absence of the sheet Q on the platen 50, determining the width (length in the main scanning direction) of the sheet Q on the platen 50, determining as to whether or not there is provided a state that the carriage 30 can be appropriately moved in a reciprocal manner along the main scanning direction, determining as to whether or not the state of the first encoder 31 (for example, a state of the slit array in the scale) is normal, etc.

In the pre-scan processing, the main controller 10 instructs the print controller 20 so as to cause the carriage 30 to make a reciprocal movement one time from the home position in the main scanning direction. Further, during the one reciprocal movement, the main controller detects the detection object based on the detection signal from the medium sensor 25 and/or monitors the position and/or the velocity during the movement to thereby collect information necessary for the specified object. Furthermore, the main controller 10 performs a variety of kinds of processings for the specified object, based on the collected information.

Moreover, in the present embodiment, the main controller 10 obtains the first end detection position Pa and the second end detection position Pb of the flushing guide 55 based on the detection signal from the medium sensor 25, during the movement of the carriage 30 in the main scanning direction for the pre-scan processing.

Namely, the main controller 10 determines, in step S120, as to whether or not the first end of the flushing guide 55 is detected by the medium sensor 25. The main controller 10 repeats the determining processing of step S120 until the first end is detected. In a case that the first end is detected, the main controller 10 obtains the first end detection position Pa in step S130.

Next, in step S140, the main controller 10 determines as to whether or not the second end of the flushing guide 55 is detected by the medium sensor 25. The main controller 10 repeats the determining processing of step S140 until the second end is detected. In a case that the second end is detected, the main controller 10 obtains the second end detection position Pb in step S150.

In step S160, the main controller 10 executes a correcting processing. Specifically, the main controller 10 corrects the flushing parameter by using the first end detection position Pa and the second end detection position Pb which have been obtained. In the present embodiment, the main controller 10 performs at least the correction of the flushing starting position. Specifically, the man controller 10 calculates the actual FLS starting position Pst, based on the formulas (1) and (2) as described above.

It is allowable that the main controller 10 further performs correction of the flushing cycle and/or the jetting number of times in step S160. Further, as described above, it is allowable that in the correcting processing, the main controller 10 performs corrections of the flushing cycle and/or the jetting number of times, rather than performing the correction of the flushing starting position (namely, the calculation of the actual FLS starting position Pst).

After ending the correcting processing, the main control 10 executes the flushing processing in step S170. Note that although the details of the pre-scan processing is omitted in FIG. 5, the pre-scan processing is basically completed before the execution of the processing of step S170. In a case that the main controller 10 causes the carriage 30 to make one reciprocal movement for the pre-scan processing, the main controller 10 returns the carriage 30 again to the home position, via the instruction to the print controller 20.

In step S170, the main controller 10 causes the carriage 30 to make one-way movement from the home position in the main scanning direction, by the instruction to the print controller 20. Further, in a case that the carriage 30 reaches the actual FLS starting position Pst (namely, in a case that the detection position Px coincides with the actual FLS starting position Pst), the main controller 10 starts the flushing. Namely, by giving the instruction to the print controller 20, the main controller 10 causes the recording head 21 to jet the ink therefrom in the flushing cycle and by the jetting number of times, while causing the carriage 30 to move in the main scanning direction (for example, to move at the constant velocity) from the actual FLS starting position Pst.

After the ending of the flushing, the main controller 10 causes the carriage 30 to stop once. Then, in step S180, the main controller 10 executes a printing processing. Namely, the main controller 10 instructs the print controller 20 and the conveyance controller 40 so as to form, on the sheet Q, an image based on the image data. With this, an image as the object of printing is formed on the sheet Q while the sheet Q is being conveyed in the sub-scanning direction and the carriage is reciprocally being moved in the main scanning direction.

(4) Effect of Embodiment and Corresponding Relationship Among Terms

In the image forming system 1 of the present embodiment as explained above, the actual positions of the first and second detection targets 56 and 57 which are fixed to the flushing guide 55 are obtained, and the first end detection position Pa and the second end detection position Pb are obtained based on the actual positions of the first and second detection targets 56 and 57. Further, the actual FLS starting position Pst is determined based on the first end detection position Pa and the second end detection position Pb which have been obtained. Accordingly, it is possible to start the flushing at an appropriate position in accordance with the actual position of the flushing guide 55. Namely, it is possible to jet the ink appropriately to the flushing guide 55 at the time of executing the flushing.

Further, in the present embodiment, the ideal FLS staring position Pst0 is corrected and calculated, thereby calculating the actual FLS starting position Pst. Specifically, the actual FLS starting position Pst is calculated based on the formulas (1) and (2) as described above. Accordingly, it is possible to calculate the actual FLS starting position Pst by a simple linear arithmetic.

Furthermore, in the present embodiment, the first end detection position Pa and the second end detection position Pb used to calculate the actual FLS starting position Pst are obtained in a case that the carriage 30 is moved in the pre-scan processing. Namely, the carriage 30 is not moved separately from the pre-scan so as to obtain the first end detection position Pa and the second end detection position Pb. Accordingly, it is possible to efficiently obtain the first end detection position Pa and the second end detection position Pb.

Moreover, in the present embodiment, the flushing cycle and/or the jetting number of times may be corrected in addition to or instead of calculating the actual FLS starting position Pst. For example, by further correcting the flushing cycle and/or the jetting number of times in addition to calculating the actual FLS starting position Pst, it is possible to cause the ink to be jetted to the inside of the flushing guide 55 in a more ensured manner at the time of the flushing.

Here, the corresponding relationship among the terms will be clarified. In the present embodiment, the image forming system 1 corresponds to an example of an "image forming apparatus" in the present disclosure. The CR motor 31 corresponds to an example of a "motor" in the present disclosure. The carriage 30 corresponds to an example of a "movable body" in the present disclosure. The support frame 58 corresponds to an example of a "supporting part" in the present disclosure. Each of the first and second detection targets 56 and 57 corresponds to an example of a "detection target" in the present disclosure. The medium sensor 25 corresponds to an example of a "detector" in the present disclosure. The first encoder 33 corresponds to an example of an "encoder" in the present disclosure. The first signal processing circuit 34 corresponds to an example of a "position detecting section" in the present disclosure. The main controller 10 corresponds to an example of a "controller" in the present disclosure. The first end detection position Pa corresponds to an example of a "first detection position" in the present disclosure. The second end detection position Pb corresponds to an example of a "second detection position" in the present disclosure. Each of the "Δa" and "Δb" in the formula (2) corresponds to an example of a "positional deviation" in the present disclosure. More specifically, the "Δa" corresponds to an example of a "first positional deviation" in the present disclosure, and the "Δb" corresponds to an example of a "second positional deviation" in the present disclosure. The ideal FLS starting position Pst0 corresponds to an example of a "theoretic starting position" in the present disclosure. The sheet Q corresponds to an example of a "sheet" in the present disclosure. The flushing cycle corresponds to an example of a "predetermined cycle" in the present disclosure. The jetting number of times corresponds to an example of a "predetermined number of times" in the present disclosure.

The processing of step S110 corresponds to an example of a "pre-processing" in the present disclosure. Causing the carriage 30 to move in step S110 corresponds to an example of a "moving processing" (in particular, a "first moving processing") in the present disclosure. Each of the processings of step S130 and step S150 corresponds to an example of a "position obtaining processing" in the present disclosure. The processing of step S160 corresponds to an example of a "determining processing" in the present disclosure. The processing of step S170 corresponds to an example of a "flushing processing" in the present disclosure. Further, causing the carriage 30 to move in the processing of step S170 corresponds to an example of a "second moving processing" in the present disclosure.

2. OTHER EMBODIMENTS

In the foregoing, the embodiment of the present disclosure has been explained. It is allowable, however, that the present disclosure is not limited to or restricted by the above-described embodiment, and the present disclosure may be modified in a variety of kinds of way.

(1) In the above-described embodiment, the first detection target 56 is fixed to be adjacent to the outer side of the first end of the flushing guide 55, and the second detection target 57 is fixed to be adjacent to the outer side of the second end of the flushing guide 55. It is allowable, however, that the first and second detection targets 56 and 57 are arranged to the flushing guide 55 in any way, or are fixed to any positions, respectively.

For example, it is allowable that the first and second detection targets 56 and 57 are fixed to an inner wall of the flushing guide 55 having the dish (plate)-like shape. Specifically, the first detection target 56 may be, for example, fixed to an inner surface of a side wall corresponding to the first end of the flushing guide 55, namely to a surface facing a space in which the ink is jetted. Similarly, the second detection target 57 may be, for example, fixed to an inner surface of a side wall corresponding to the second end of the flushing guide 55.

Alternatively, it is allowable, for example, that the first detection target 56 is fixed to an upper surface of the first end of the flushing guide 55, and that the second detection target 57 is fixed to an upper surface of the second end of the flushing guide 55. Namely, it is allowable to provide such a state that the flushing guide 55 and each of the first and second detection targets 56 and 57 are stacked in the up-down direction.

Figure 6:
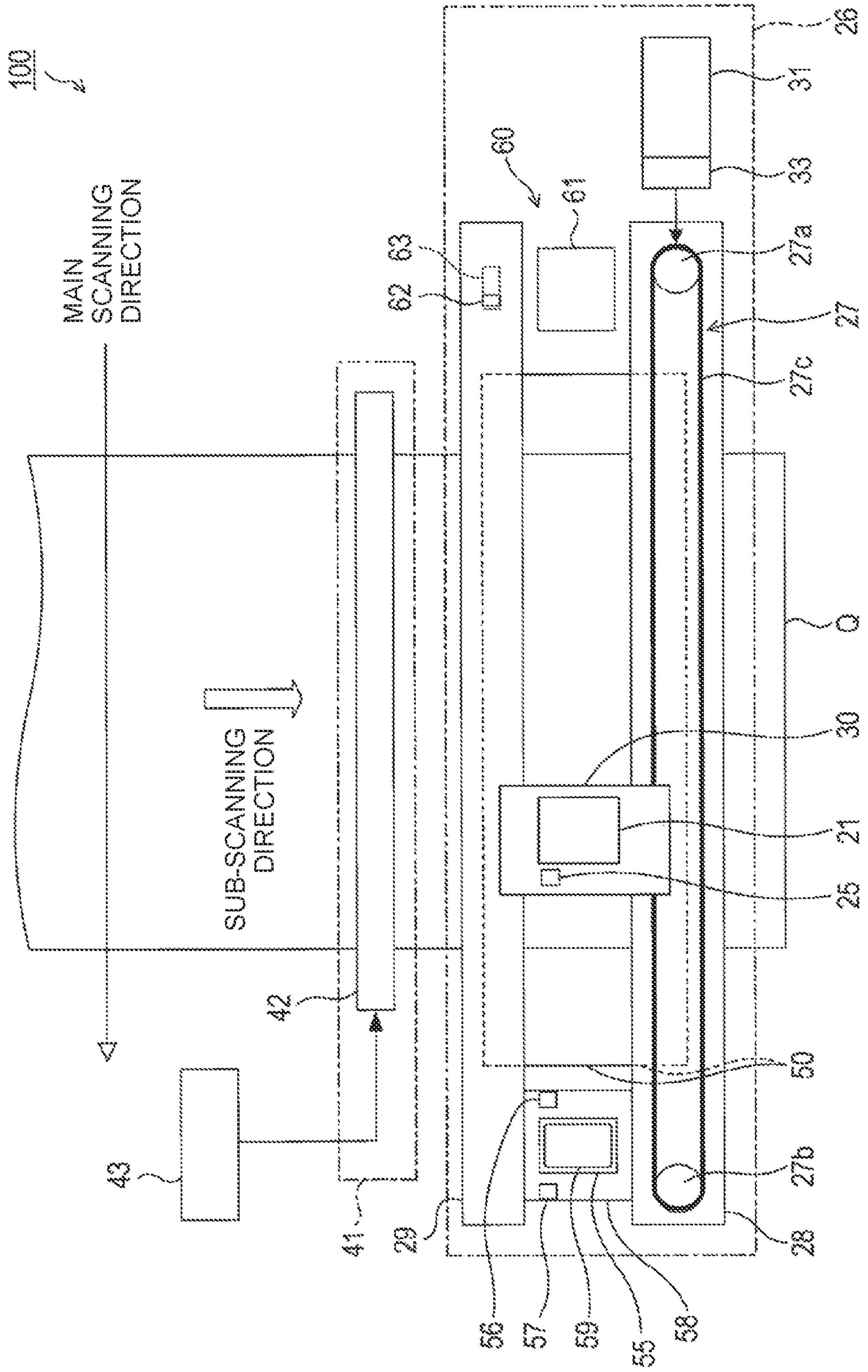
FIG. 6 is a view for explaining a first modification of the image forming system.

Still alternatively, it is allowable that each of the first and second detection targets 56 and 57 is fixed to the flushing guide 55 in a state that each of the first and second detection targets 56 and 57 is separated from the flushing guide 55 along the main scanning direction, as depicted in FIG. 6. In an image forming system 100 depicted in FIG. 6, first and second detection targets 56 and 57 are fixed to a support frame 58. Further, each of the first and second detection targets 56 and 57 is arranged to be separated from the flushing guide 55 along the main scanning direction. In such an image forming system 100, the main controller 10 is capable of calculating the actual FLS starting position Pst by performing the above-described correcting calculation while considering a distance between the first detection target 56 and the first end of the flushing guide 55 and a distance between the second detection target 57 and the second end of the flushing guide 55, similarly to the above-described embodiment. For example, the main controller 10 is capable of obtaining, as the first end detection position Pa, a position which is advanced in the main scanning direction from the detection position Px in a case that the first detection target 56 is detected, by the distance between the first detection target 56 and the first end. Further, the main controller 10 is capable of obtaining, as the second end detection position Pb, a position which is returned in the home direction from the detection position Px in a case that the second detection target 57 is detected, by the distance between the second detection target 57 and the second end.

Figure 7:
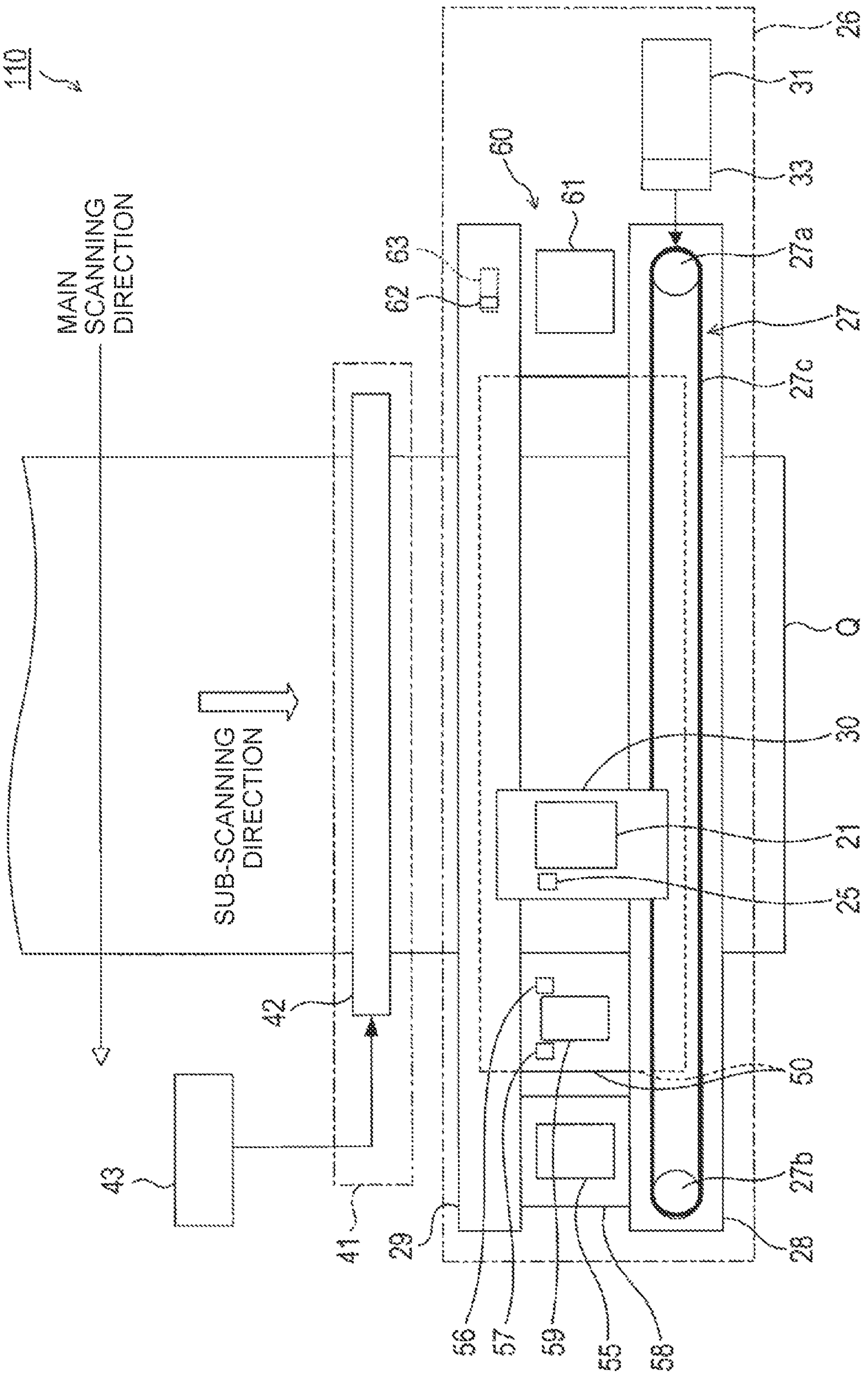
FIG. 7 is a view for explaining a second modification of the image forming system.

(2) It is allowable that the flushing guide 55 and the first and second detection targets 56 and 57 are provided, respectively, on locations which are different from those in the above-described embodiment. Further, it is also allowable that the ink absorbing member 59 is arranged together with the first and second detection targets 56 and 57, without having the flushing guide 55 accompanying therewith, as described above. For example, as depicted in FIG. 7 as an example, the ink absorbing member 59 and the first and second detection targets 56 and 57 are provided on the platen 50. In an image forming system 110 depicted in FIG. 7 as an example, the ink absorbing member 59 and the first and second detection targets 56 and 57 are provided on the downstream side in the main scanning direction with respect to an area, on the platen 50, in which the sheet Q is conveyed. Also in the image forming system 110, it is possible to correct the flushing parameter by a same method as that is the above-described embodiment, by replacing, with the ink absorbing member 59, the flushing guide 55 of the correcting method of the flushing parameter in the above-described embodiment. Specifically, an end on the side of the home direction in the ink absorbing member 59 is considered as the first end of the flushing guide 55 in the correcting method of the above-described embodiment, and an end on the side of the main scanning direction in the ink absorbing member 59 is considered as the second end of the flushing guide 55 in the correcting method of the above-described embodiment, thereby making it possible to correct the flushing parameter by the correcting method of the above-described embodiment. Note that in the image forming system 110, the ink absorbing member 59 corresponds to an example of the "ink receiving unit" in the present disclosure.

In the image forming system 110 of FIG. 7, the ink absorbing member 59 and the first and second detection targets 56 and 57 may be fixed to the platen 50 in any way, and may be fixed, respectively, to any positions in the platen 50. For example, the ink absorbing member 59 may be directly fixed to a part of a surface of the platen 50.

Alternatively, for example, the flushing guide 55 and the first and second detection targets 56 and 57 may be provided at a location on the home direction side with respect to the area in which the sheet Q is conveyed. Still alternatively, the ink absorbing member 59 may be provided, together with the first and second detection targets 56 and 57, on the side of the home direction with respect to the area in which the sheet Q is conveyed, without having the flushing guide 55 accompanying therewith. Specifically, as depicted in FIG. 8 as an example, the ink absorbing member 59 and the first and second detection targets 56 and 57 may be provided, respectively, on predetermined locations in the capping mechanism 60.

Figure 8:
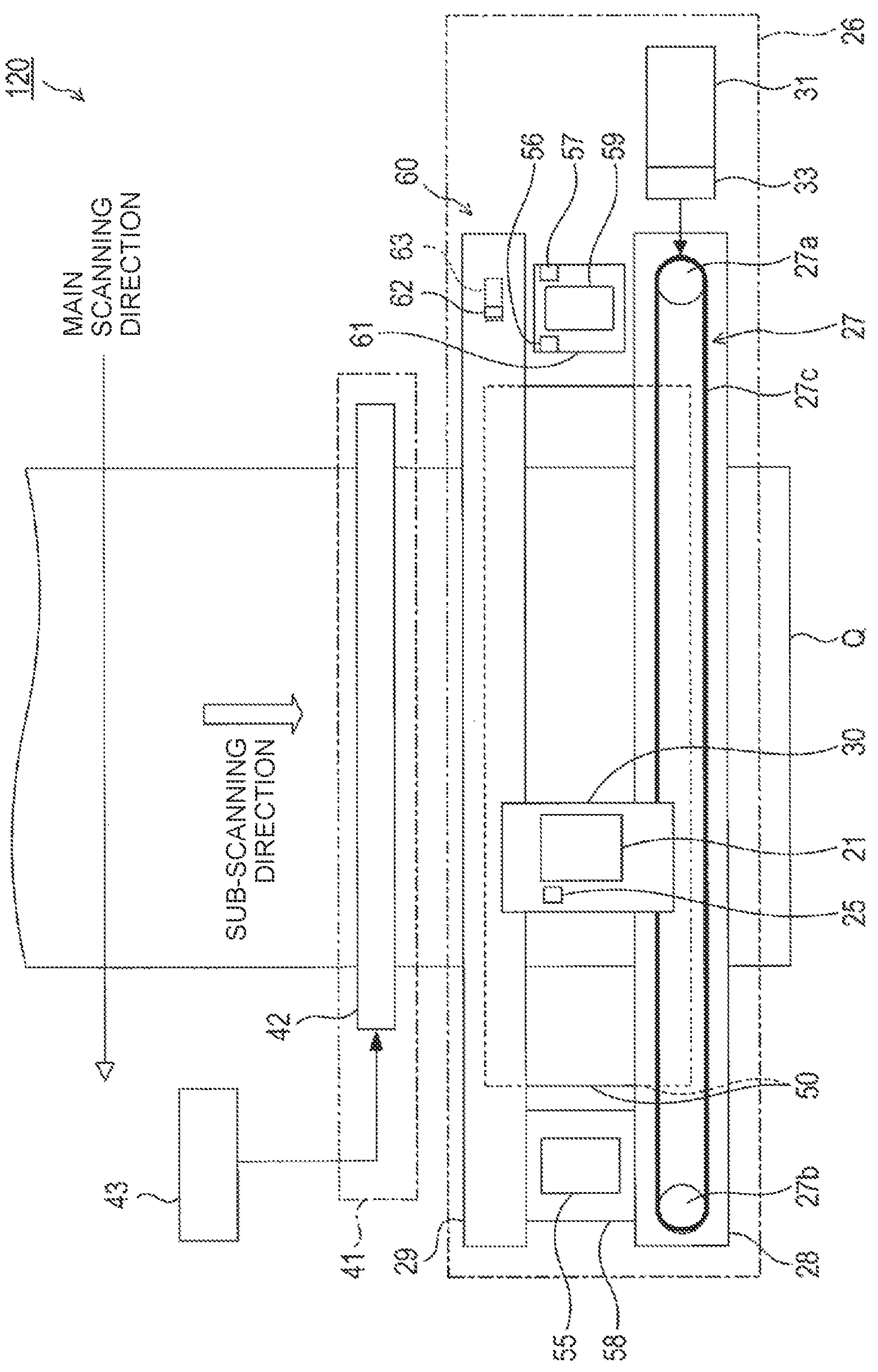
FIG. 8 is a view for explaining a third modification of the image forming system.

In an image forming system 120 as depicted in FIG. 8 as an example, the ink absorbing member 59 and the first and second detection targets 56 and 57 are provided on an upper surfaced of the cap 61. Note that each of the ink absorbing member 59 and the first and second detection targets 56 and 57 may be fixed in any location and in any way, in the capping mechanism 60. The first and second detection targets 56 and 57 may be adjacent to the ink absorbing member 59, or the first and second detection targets 56 and

57 may be fixed to the cap 61 in a state that the first and second detection targets 56 and 57 are separated from the ink absorbing member 59 along the main scanning direction. Also in the image forming system 120, it is possible to correct the flushing parameter by a same method as that is the above-described embodiment, by replacing, with the ink absorbing member 59, the flushing guide 55 of the correcting method of the flushing parameter in the above-described embodiment. Specifically, an end on the side of the main scanning direction in the ink absorbing member 59 is considered as the first end of the flushing guide 55 in the correcting method of the above-described embodiment, and an end on the side of the home direction in the ink absorbing member 59 is considered as the second end of the flushing guide 55 in the correcting method of the above-described embodiment, thereby making it possible to correct the flushing parameter by the correcting method of the above-described embodiment. Note that in the image forming system 120, the ink absorbing member 59 corresponds to an example of the "ink receiving unit" in the present disclosure.

In the image forming system 120 depicted in FIG. 8 as an example, it is allowable, for example, that the first end detection position Pa and the second end detection position Pb are obtained at a time of ending of the reciprocal movement of the carriage 30 in the pre-scan, namely, at a time that the carriage 30 which has been moved from the home position in the main scanning direction returns again to the home position.

(3) It is allowable that the recording head 21 is provided with a nozzle of which number (quantity) is arbitrary. In a case that the recording head 21 is provided with a plurality of nozzles, the plurality of nozzles may be arranged to be separated from each other along the main scanning direction. In this case, the main controller 10 may detect the detection position Px of the nozzle for each of the plurality of nozzles. Further, the main controller 10 may start the flushing, individually with respect to each of the plurality of nozzles, in a case that the detection position Px corresponding to each of the plurality of nozzles reaches the actual FLS starting position Pst.

Further, in a case that the recording head 21 is provided with the plurality of nozzles, it is allowable to set not less than two mutually different kinds of actual FLS starting positions Pst. Further, it is allowable to make at least one nozzle, among the plurality of nozzles, to correspond to each of the not less than two kinds of actual FLS starting positions Pst.

(4) In the above-described embodiment, although the main controller 10 calculates the actual FLS starting position Pst based on the first end detection position Pa and the second end detection position Pb, the main controller 10 may calculate the actual FLS starting position Pst by using either one of the first end detection position Pa and the second end detection position Pb (namely, without using the other of the first end detection position Pa and the second end detection position Pb). Namely, it is allowable that either one of the first and second detection targets 56 and 57 is not provided.

For example, it is allowable that the second detection target 57 is not provided. In such a case, the main controller 10 may calculate the actual FLS starting position Pst by using the first end detection position Pa. For example, the main controller 10 may calculate, as the corrected value ΔP, the Δa as it is, or a value obtained by multiplying Δa with a predetermined coefficient. Further, the main controller 10 may determine a position which is located on the side in the home position, with respect to the ideal FLS starting position Pst0, by a distance corresponding to ΔP, to be the actual FLS starting position Pst.

Further, it is allowable that the first detection target 56 is not provided. In such a case, the main controller 10 may use the second end detection position Pb so as to calculate the actual FLS starting position Pst. For example, the main controller 10 may calculate, as the corrected value ΔP, the Δb as it is, or a value obtained by multiplying Δb with a predetermined coefficient. Further, the main controller 10 may determine a position which is located on the side in the home position, with respect to the ideal FLS starting position Pst0, by a distance corresponding to ΔP, to be the actual FLS starting position Pst.

Furthermore, in a case that the actual FLS starting position Pst is calculated by using the first end detection position Pa, but without using the second end detection position Pb, it is allowable to execute a series of the processings from step S120 to S170 while the carriage 30 is being subjected to the one-way movement in the main scanning direction. Namely, in a case that the first end detection position Pa is obtained while the carriage 30 is being moved one way, the actual FLS starting position Pst is calculated based on the first end detection position Pa, while continuing the one-way movement of the carriage 30 (while allowing the carriage 30 to continuously move one way). Moreover, it is allowable to start the flushing in a case that the detection position Px reaches the actual FLS starting position Pst by the one-way movement of the carriage 30 which is being continued. Namely, for example, it is allowable to complete the calculation of the actual FLS starting position Pst and the flushing processing based on the calculated actual FLS starting position Pst, in a process that the carriage 30 moves in a forwarding direction (main scanning direction) in the reciprocal movement of the carriage 30 in the pre-scan.

(5) In the above-described embodiment, the example in which the flushing starting position is corrected, as a specific method of correcting the start timing of the flushing, is indicated. It is allowable, however, to correct the start timing of the flushing by a method different from the method of correcting the flushing starting position.

For example, in response to such a situation that the detection position Px of the carriage 30 reaches the ideal FLS start position Pst0, it is allowable to start the flushing (namely to start the jetting of the ink) after elapse of a prescribed time since a timing at which the detection position Px reaches the ideal FLS starting position Pst0. Then, the prescribed time may be corrected. The prescribed time may be set at any time which is not less than 0 (zero). The main controller 10 may be configured such that, for example, in a case that the actual position of the carriage 30 is advanced with respect to the detection position Px, the main controller 10 makes the prescribed time to be short, thereby starting the flushing at a timing which is faster after the detection position Px reaches the ideal FLS starting position Pst0. Conversely, the main controller 10 may be configured such that, for example, in a case that the actual position of the carriage 30 is deviated to the upstream side in the moving direction of the carriage 30 with respect to the detection position Px, the main controller 10 makes the prescribed time to be long, thereby starting the flushing at a timing which is later after the detection position Px reaches the ideal FLS starting position Pst0.

(6) The technique of the present disclosure is also applicable to an image forming system in which a linear encoder is used as the first encoder 33. Further, the technique of the present disclosure is also applicable to an image forming system in which a sensor which is different from both of the rotary encoder and the linear encoder is used as a sensor configured to detect the position of the carriage 30.

(7) In the above-described embodiment, although the correcting calculation (specifically, steps S120 to S160 of FIG. 5) is performed by the main controller 10, the correcting calculation may be performed at any location or part (component). It is allowable that a part or all of the correcting calculation is performed at a location or part (component) which is different from the main controller 10 (for example, in the print controller 20).

(8) It is allowable that a function possessed by one constituent component in the above-described embodiment is provided in a dividing manner in a plurality of constituent components. It is allowable that a function possessed by a plurality of constituent components is integrated in one constituent component. Further, it is also allowable that a part of the configuration of the above-described embodiment may be omitted. Furthermore, it is also allowable that at least a part of the configuration of the above-described embodiment is added to or replaced with respect to that of the configuration of the another embodiment as described above. The embodiments of the present disclosure include various embodiments or aspects that are included in the technical ideas specified by the wordings of the following claims.

What is claimed is:

1. An image forming apparatus comprising:

a motor;

a movable body configured to be moved by the motor along a moving direction;

a recording head mounted on the movable body and configured to jet ink onto a sheet while being moved together with the movable body to form an image on the sheet;

an ink receiving unit configured to receive the ink jetted from the recoding head at a time of executing a flushing and fixed so as not to be moved together with a movement of the movable body;

a detection target fixed directly or indirectly to the ink receiving unit;

a detector mounted on the movable body and configured to detect the detection target;

an encoder configured to output a signal in accordance with a rotation amount of the motor or a moving amount of the movable body;

a position detecting section configured to detect a position of the movable body based on the signal outputted from the encoder; and a controller, wherein the controller is configured to execute:

a moving processing for moving the movable body along the moving direction;

a position obtaining processing for obtaining a position, of the movable body, from the position detecting section in a case that the detection target is detected by the detector during the movement of the movable body in the moving processing;

a determining processing for determining a start timing of the flushing based on the position, of the movable body, obtained in the position obtaining processing; and a flushing processing for starting the flushing in accordance with the start timing determined in the determining processing.

2. The image forming apparatus according to claim 1, wherein in the determining processing, the controller is configured to determine, as the start timing, a flushing starting position which is a position, of the movable body, in a case that the flushing is started, and in the flushing processing, the controller is configured to start the flushing at the flushing starting position determined in the determining processing.

3. The image forming apparatus according to claim 2, wherein in the determining processing, the controller is configured to determine the flushing starting position based on a positional deviation as a difference between a position, of the movable body, obtained in the position obtaining processing and a design position, of the movable body, at which the detection target is to be detected by the detector.

4. The image forming apparatus according to claim 3, wherein in the determining processing, the controller is configured to determine the flushing starting position by correcting, based on the positional deviation, a theoretical starting position which is a design position of the movable body, which is previously determined and at which the flushing is to be started.

5. The image forming apparatus according to claim 3, wherein the moving processing includes:

a first moving processing for moving the movable body in the moving direction so that the detection target is detected by the detector, and then moving the movable body in an opposite direction opposite to the moving direction toward an upstream, in the moving direction, with respect to the ink receiving unit; and a second moving processing for moving the movable body in the moving direction after executing the first moving processing so that the recording head passes the ink receiving unit, in the position obtaining processing, the controller is configured to obtain a position, of the movable body, from the position detecting section in a case that the detection target is detected by the detector during the movement of the movable body in the moving direction in the first moving processing, and in the flushing processing, the controller is configured to start the flushing during the movement of the movable body in the second moving processing.

6. The image forming apparatus according to claim 5, wherein in a case of forming the image on the sheet, the controller is configured to execute a pre-processing for performing reciprocal moving of the movable body in the moving direction prior to formation of the image, for a specified object which is different from the formation of the image, and the first moving processing is included in the reciprocal moving of the movable body in the pre-processing.

7. The image forming apparatus according to claim 6, wherein the detector is configured to detect the sheet, and the specified object includes detection of presence or absence of the sheet and/or detection of a width in the moving direction of the sheet, based on a result of detection of the sheet by the detector.

8. The image forming apparatus according to claim 5, further comprising another detection target which is provided separately from the detection target and which is fixed directly or indirectly to the ink receiving unit.

9. The image forming apparatus according to claim 8, wherein the detection target is arranged on the upstream in the moving direction with respect to the ink receiving unit, and the another detection target is arranged on a downstream in the moving direction with respect to the ink receiving unit.

10. The image forming apparatus according to claim 8, wherein in the position obtaining processing, the controller is configured to obtain, from the position detecting section, a first detection position which is a position of the movable body in a case that the detection target is detected by the detector and a second detection position which is a position of the movable body in a case that the another detection target is detected by the detector, and in the determining processing, the controller is configured to determine the flushing starting position based on a first positional deviation and a second positional deviation, the first positional deviation being a difference between the first detection position and a design position, of the movable body, at which the detection target is to be detected by the detector, the second positional deviation being a difference between the second detection position and a design position, of the movable body, at which the another detection target is to be detected by the detector.

11. The image forming apparatus according to claim 10, wherein in the determining processing, the controller is configured to determine, based on a formula (1) and a formula (2), the flushing starting position satisfying the formula (1) and the formula (2):

$$Pst = Pst0 - \Delta P \quad (1)$$

$$\Delta P = \frac{\Delta b - \Delta a}{Pb - Pa} \cdot (Pst - \alpha) + \beta \quad (2)$$

note that Δa=Pa0−Pa, Δb=Pb0−Pb

α=Pa, β=Δa or α=Pb, β=Δb in the formulas (1) and (2),

Pst: Actual FLS starting position

Pst0: Ideal FLS starting position

Pa: First end detection position

Pb: Second end detection position

Pa0: First end ideal position

Pb0: Second end ideal position.

12. The image forming apparatus according to claim 10, wherein the flushing processing includes executing, from the flushing starting position, a jetting processing of jetting the ink from the recording head a predetermined number of times in a predetermined cycle, and the determining processing includes determining the predetermined cycle and/or the predetermined number of times based on the first positional deviation and the second positional deviation.

13. The image forming apparatus according to claim 1, wherein in the flushing processing, in response to reaching of the movable body to a reference position as a result of the movement of the movable body in the moving direction, the controller is configured to start the flushing after elapse of a prescribed time since a timing at which the movable body reaches the reference position, while the controller continues the movement of the movable body, and in the determining processing, the controller is configured to determine the prescribed time as the start timing.

14. The image forming apparatus according to claim 1, wherein the detection target is arranged on an upstream, in the moving direction, with respect to the ink receiving unit.

15. The image forming apparatus according to claim 14, wherein the moving processing includes moving the movable body one way in the moving direction, and the controller is configured to execute the position obtaining processing, the determining processing and the flushing processing while the movable body is being continuously moved one way in the moving direction in the moving processing.

16. The image forming apparatus according to claim 1, further comprising a supporting part configured to support the ink receiving unit, wherein the detection target is fixed to the supporting part.

17. The image forming apparatus according to claim 1, further comprising a platen extending along the moving direction and to face the recoding head, wherein the ink receiving unit and the detection target are fixed to the platen.

18. The image forming apparatus according to claim 1, further comprising a capping mechanism provided at a predetermined standby position at which the movable body is made to stand by during a period of time in which formation of image is not performed on the sheet, the capping mechanism being configured to cover the recording head, wherein the ink receiving unit is provided on the capping mechanism, and the detection target is fixed to the capping mechanism.

* * * * *